United States Patent Office 3,517,008
Patented June 23, 1970

3,517,008
1-ALKYL-6-SUBSTITUTED ISOXAZOLO[3,4-d]
PYRIMIDIN-3(1H)-ONES
Dong H. Kim, Wayne, and Arthur A. Santilli, Havertown, Pa., assignors to American Home Products Corporation, New York, N.Y., a corporation of Delaware
No Drawing. Filed Apr. 5, 1968, Ser. No. 719,239
Int. Cl. C07d 99/02
U.S. Cl. 260—256.4                                    10 Claims

ABSTRACT OF THE DISCLOSURE

This invention concerns 1-alkyl-6-substituted isoxazolo[3,4-d]pyrimidin-3(1H)-ones which are valuable intermediates in the preparation of 4-hydroxy(lower)alkylamino - N,2 - disubstituted - 5 - pyrimidinecarboxamides which are pharmacologically active as central nervous system depressants.

---

This invention relates to new and novel isoxazolopyrimidinones. In particular, this invention concerns 1-alkyl - 6 - substituted isoxazolo[3,4-d]pyrimidin-3(1H)-ones which are useful intermediates in the preparation of 4 - hydroxy(lower)alkylamino - N,2 - disubstituted - 5-pyrimidinecarboxamides which in standard and accepted pharmacological tests have demonstrated central nervous system depressant activity.

The new and novel compounds within the scope of the present invention are represented by the following structural formula:

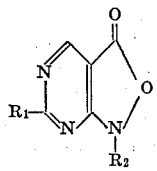

wherein $R_1$ is selected from the group consisting of lower alkyl, phenyl, halophenyl, lower alkylphenyl, and lower alkoxyphenyl; and $R_2$ is lower alkyl. As employed herein the terms "lower alkyl," "lower alkoxy" and the like are meant to include both branched and straight chain moieties having from one to about eight carbon atoms. Typical examples thereof are:

1-methyl-6-phenylisoxazolo[3,4-d]pyrimidin-3(1H)-one;
1-ethyl-6-phenylisoxazolo[3,4-d]pyrimidin-3(1H)-one;
6-phenyl-1-propylisoxazolo[3,4-d]pyrimidin-3(1H)-one;
6-(m-chlorophenyl)-1-methylisoxazolo[3,4-d]pyrimidin-3(1H)-one; and
1,6-dimethylisoxazolo[3,4-d]pyrimidin-3(1H)-one.

The new and novel compounds of the present invention are prepared by the process which is hereinafter schematically illustrated.

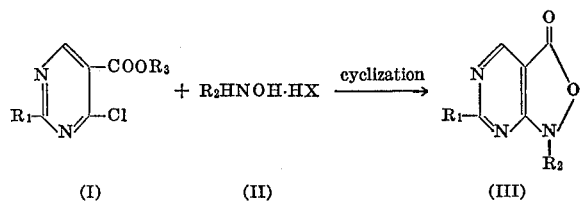

wherein $R_1$ and $R_2$ are defined as above, $R_3$ is lower alkyl and X is a halogen. The cyclization reaction is effected by contacting a 4-chloro-5-carbalkoxypyrimidine (I) with an appropriate hydroxylamine hydrohalide salt (II), in the presence of an alkali metal carbonate or bicarbonate, in an alkanol at about reflux temperatures for a period of about one to about four hours. Preferably this reaction is conducted with a hydroxylamine hydrochloride, in the presence of sodium bicarbonate, in ethanol at the reflux temperature of the reaction mixture for about two hours.

When the cyclization reaction is complete, the resulting 1 - alkyl - 6 - substituted isoxazolo[3,4-d]pyrimidin-3(1H)-one (III) is separated by standard recovery procedure e.g. the reaction mixture is cooled, filtered and the collected solid (III) may be recrystallized from a suitable solvent e.g. an alkanol. The 4-chloro-5-carbalkoxypyrimidines (I) employed as starting materials in the above process are prepared by the procedure described by Z. Budesinsky, in Coll. Czeck. Chem. Commun., 14 p. 223 (1949). The hydroxylamine hydrohalide reactants (II) are commercially available or are easily prepared by the procedures well known in the chemical art.

The new and novel 1 - alkyl - 6 - substituted isoxazolo[3,4-d]pyrimidin-3(1H)-ones (III) of the present invention are useful and have utility as intermediates in the preparation of 4 - hydroxy(lower)alkylamino-N,2-disubstituted-5-pyrimidinecarboxamides which are described in copending U.S. patent application, Ser. No. 719,240 by Dong H. Kim and Arthur A. Santilli, entitled "4-Hydroxy-(lower)Alkylamino - N,2 - Disubstituted - 5 - Pyrimidinecarboxamides," and filed in the U.S. Patent Office on the same day as the subject application. These 4-hydroxy(lower)alkylamino - N,2 - disubstituted - 5 - pyrimidinecarboxamides when tested by standard and accepted pharmacological procedures in laboratory animals e.g. mice, rats, cats, dogs, rabbits, guinea pigs, monkeys and the like exhibit central nervous system activity and are useful as depressant agents to produce a calming effect. When these 4 - hydroxy(lower)alkylamino - N,2 - disubstituted-5-pyrimidinecarboxamides are tested in mice by the procedure described in Turner, Screening Methods in Pharmacology, Academic Press, New York, p. 80 (1965) in the section entitled "A Test Group for Central Depressants," they produce both decreased respiration and decreased motor activity at an oral dosage of 127 mg./kilo to 400 mg./kilo when administered orally as a one percent suspension emulsified with polyethylene oxide sorbitan monooleate.

The following examples are given by way of illustration and are not to be construed as limitations of this invention, many variations of which are possible without departing from the scope and spirit thereof.

EXAMPLE I

A mixture of 2.6 g. of 4-chloro-5-carbethoxy-2-phenylpyrimidine, 2.5 g. of methylhydroxylamine hydrochloride, and 3.4 g. of sodium bicarbonate in 30 ml. of absolute ethanol is refluxed for one and a half hours. After removing the inorganic salts by filtration of the hot reaction mixture, the filtration is chilled on ice to cause a separation of crystals which are collected on a filter. The product weighs 2.0 g. and melts at 174–176° C. Recrystallization from ethanol affords an analytical sample of 1-methyl-6-phenylisoxazolo-[3,4-d]-pyrimidin-3(1H)-one, M.P. 174–176° C.

Analysis.—Calcd. for $C_{12}H_9N_3O_2$ (percent): C, 63.43; H, 3.99; N, 18.49. Found (percent): C, 63.75; H, 3.96; N, 18.35.

In a similar fashion, the following compounds are prepared:

1 - ethyl- 6 - phenylisoxazolo[3,4 - d]pyrimidin-3(1H)-one from ethyl hydroxlamine hydrochloride and 4-chloro-5-carbethoxy-2-phenylpyrimidine.

6 - phenyl - 1-propylisoxazolo[3,4-d]pyrimidin-3(1H)-one from propyl hydroxylamine hydrochloride and 4-chloro-5-carbethoxy-2-phenylpyrimidine.

EXAMPLE II

A mixture of 5.2 g. of 4-chloro-2-(m-chlorophenyl)-5-carbethoxypyrimidine, 5.0 g. of methylhydroxylamine, hydrochloride, and 6.8 g. of sodium bicarbonate in 30 ml. of absolute ethanol is refluxed for one hour. After removing the inorganic salts by filtration of the hot reaction mixture, the filtrate is chilled in ice to cause a separation of crystals which are collected on a filter. Recrystallization from ethanol yields 6-(m-chlorophenyl)-1-methylisoxazolo[3,4-d]pyrimidin-3(1H)-one.

Similarly, reacting a 4-chloro-5-carbalkoxypyrimidine with an appropriate hydroxylamine hydrohalide the following compounds are obtained:

1,6 - dimethylisoxazolo[3,4 - d]pyrimidin - 3(1H)-one; 1,6-diethylisoxazolo[3,4-d]pyrimidin-3(1H)-one; and 1-ethyl-6-(iso-butyl)isoxazolo[3,4-d]pyrimidin-3(1H)-one.

EXAMPLE III

A mixture of 1.8 g. of 4-chloro-5-carbomethoxy-2-(m-iodophenyl)pyrimidine, 1.75 g. of ethylhydroxylamine hydrochloride, and 1.7 g. of potassium bicarbonate in 15 ml. of absolute propanol is refluxed for four hours. After removing the inorganic salts by filtration of the hot reaction mixture, the filtrate is chilled in ice to cause separation of crystals which are collected on a filter. Recrystallization from ethanol affords 1-ethyl-6-(m - iodophenyl)isoxazolo[3,4-d]-pyrimidin-3(1H)-one.

In a similar manner, 6-(p-chlorophenyl-1-ethylisoxazolo[3,4-d]pyrimidin - 3(1H)-one; 6-(p-bromophenyl)-1-ethylisoxazolo[3,4 - d]pyrimidin - 3(1H) - one; and 6-(p-fluorophenyl) - 1 - propylisoxazolo[3,4 - d]pyrimidin - 3-(1H)-one are prepared.

EXAMPLE IV

Repeating the procedure of Examples I–III to react an appropriate hereinafter listed 4-chloro-5-carbalkoxypyrimidines and hydroxylamines, the following products are obtained.

| Reactants | Product |
|---|---|
| 4-chloro-5-carbethoxy-2-(p-tolyl)-pyrimidine and methylhydroxylamine hydrochloride. | 1-methyl-6-(p-tolyl)isoxazolo-[3,4-d]pyrimidin-3(1H)-one. |
| 4-chloro-5-carbomethoxy-2-(p-isopropoxyphenyl)pyrimidine and methylhydroxylamine hydrochloride. | 1-methyl-6-(p-isopropoxyphenyl)-isoxazolo[3,4-d] pyrimidin-3(1H)-one. |
| 4-chloro-5-carbopropoxy-2-(p-methoxyphenyl)pyrimidine and ethylhydroxylamine hydrochloride. | 1-ethyl-6-(p-methoxyphenyl)-isoxazolo[3,4-d]pyrimidin-3(1H)-one. |
| 4-chloro-5-carbethoxy-2-(m-ethylphenyl)pyrimidine and methylhydroxylamine hydrochloride. | 6-(m-ethylphenyl)-1-methyl-isoxazolo[3,4-d]pyrimidin-3(1H)-one. |
| 2-(p-butylphenyl)-4-chloro-5-carbomethoxypyrimidine and methylhydroxylamine hydrochloride. | 6-(p-butylphenyl)-1-methyl-isoxazolo[3,4-d]pyrimidin-3(1H)-one. |
| 4-chloro-5-carbethoxy-2-(o-ethoxyphenyl)pyrimidine and ethylhydroxylamine hydrochloride. | 6-(o-ethoxyphenyl)-1-ethyl-isoxazolo[3,4-d]pyrimidin-3(1H)-one. |

What is claimed is:
1. A compound selected from the group consisting of those having the formula:

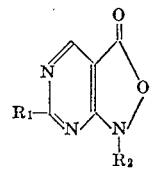

wherein $R_1$ is selected from the group consisting of lower alkyl, phenyl, halophenyl, lower alkylphenyl and lower alkoxyphenyl; and $R_2$ is lower alkyl.

2. A compound as described in claim 1 which is: 1-methyl-6-phenylisoxazolo[3,4-d]pyrimidin-3(1H)-one.
3. A compound as described in claim 1 which is: 1-ethyl-6-phenylisoxazolo[3,4-d]pyrimidin-3(1H)-one.
4. A compound as described in claim 1 which is: 6-phenyl-1-propylisoxazolo[3,4-d]pyrimidin-3(1H)-one.
5. A compound as described in claim 1 which is: 6-(m - chlorophenyl)-1-methylisoxazolo[3,4-d]pyrimidin-3(1H)-one.
6. A compound as described in claim 1 which is: 1,6-dimethylisoxazolo[3,4-d]pyrimidin-3(1H)-one.
7. A compound as described in claim 1 which is: 1 - ethyl-6-(p-methoxyphenyl)isoxazolo[3,4-d]pyrimidin-3(1H)-one.
8. A compound as described in claim 1 which is: 1-methyl-6-(p-tolyl)isoxazolo[3,4-d]pyrimidin-3(1H)-one.
9. A compound as described in claim 1 which is: 1,6-diethylisoxazolo[3,4-d]pyrimidin-3(1H)-one.
10. A compound as described in claim 1 which is: 6-(p-chlorophenyl) - 1 - ethylisoxazolo[3,4-d]pyrimidin-3(1H)-one.

References Cited

UNITED STATES PATENTS 3,056,781  10/1962  Papesch _____ 260—256.4

ALEX MAZEL, Primary Examiner

R. J. GALLAGHER, Assistant Examiner

U.S. Cl. X.R.

260—251; 424—251